July 26, 1927. 1,637,057
W. SEIZ
INDUCTION MOTOR EXCITING SYSTEM
Filed April 6, 1926
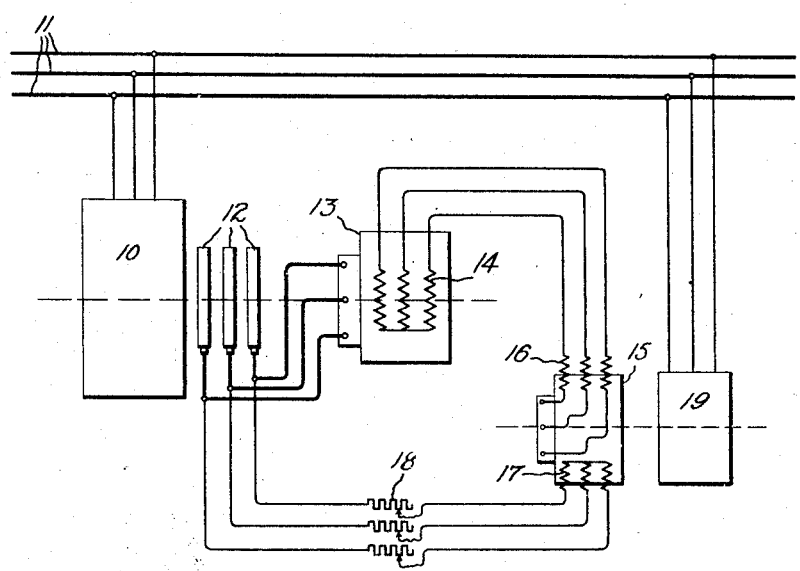
Inventor:
Walter Seiz;
by
His Attorney.

Patented July 26, 1927.

1,637,057

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

INDUCTION-MOTOR EXCITING SYSTEM.

Application filed April 6, 1926, Serial No. 100,154, and in Germany May 14, 1925.

My invention relates to the regulation of induction motors wherein commutator type exciter apparatus is connected in the secondary circuit of the induction machine, and in particular to such a combination wherein the size of the exciting apparatus heretofore used for the purpose may be economically reduced.

In any such combination the relation of inductive drop to resistance drop in the secondary exciting circuits tends to vary due to the variation in slip frequency, whereas it is generally desired that the excitation be kept proportional to the slip voltage and for this reason the theoretical and practical construction of the exciting apparatus becomes difficult. It has been proposed to make the main exciting circuit high in resistance so as to maintain the relation of inductive drop to resistance drop more nearly constant with varying frequencies. It has also been proposed to replace the resistance of such a combination with a commutator machine having its exciting winding connected in series between the slip rings of the induction motor and the usual exciter, the latter of which must still be of relatively large current carrying capacity in order to maintain the excitation of the main motor proportional to the slip voltage.

It is the object of my invention to provide a more economical exciter arrangement which will accomplish the object desired. One example of such arrangement is represented in the accompanying drawing.

In the drawing, 10 represents the main induction motor having its primary winding supplied from the source represented at 11. 12 represents the secondary rotor slip ring terminals, 13 is a commutator machine here mounted on the shaft of the main motor and driven therewith. The commutated winding of machine 13 is connected in polyphase relation to the slip rings 12 of the induction machine in the usual way. The stator member of commutator machine 13 is provided with an exciting winding 14 excited exclusively from the commutator exciter represented at 15. This exciting circuit preferably includes a series compounding winding 16 on the exciter 15. The machine 15 is also provided with a second field winding 17 energized through a resistance 18, preferably adjustable, from the slip rings 12 of the main induction motor. The exciter 15 is designed to have characteristics approximately that of a shunt machine. The resistance 18 is of such value with respect to the inductance of the winding 17 that the flow of current through this circuit is approximately directly proportional to the slip ring voltage of the induction motor. The machine is furthermore designed with as low inductance as possible so that the flow of current in the field winding 14 of machine 13 is approximately proportional to the flow of current in winding 17 and thus approximately proportional to the slip ring voltage of the induction machine irrespective of variations in frequency.

The exciter 15 is represented as being driven by a small induction motor 19 supplied from source 11. By this arrangement the exciter set 19—15 need only be designed to furnish the excitation to winding 14 of machine 13 and consequently will be of relative small size and current carrying capacity as compared to previous arrangements where this set was required to furnish a much larger exciting current. Since the exciting circuit of machine 13 is entirely separate from its armature circuit, the relation of the currents in the two circuits is of no consequence and the exciting current may be kept small. By making the resistance 18 adjustable the character of the excitation may be readily changed to obtain the best results under changing operating conditions.

The two machines 13 and 15 may both be driven from the main induction motor or from the motor 19 and various other combinations and arrangements may be made without departing from the scope of the invention as pointed out in the appended claims.

What I claim as new and desire to secure by Letters Patent of the United States, is:

1. In combination, an induction motor, a commutator machine connected in cascade with the secondary winding of said induction machine, an exciting winding on said commutator machine having no connection with the secondary winding of said induction motor, and means for supplying to said exciting winding a current which is substantially proportional to the slip voltage of said induction motor at varying slip and of a frequency equal to such slip frequency.

2. In combination, an induction motor, a commutator machine connected in cascade therewith, an exciter for furnishing the excitation of said first mentioned commutator machine, said exciter comprising a commutator machine having a series compounding winding and a separately excited winding, said last mentioned winding being excited from the secondary voltage of said induction motor through a high resistance circuit, whereby the current in said separately excited winding is approximately proportional to the secondary voltage of said induction motor and substantially independent of its slip frequency.

3. In combination, an induction motor, a commutator machine connected in cascade with the secondary winding of said induction motor, an exciting winding on said commutator machine having no connection with the secondary circuit of said induction motor, a second commutator machine for furnishing the excitation to said exciting winding, a field winding on said second commutator machine, and means for separately exciting said last mentioned field winding by a current substantially proportional to the slip voltage of said induction motor and at varying slip frequency, said second mentioned commutator machine being designed to produce an exciting current in said first mentioned exciting winding which is substantially proportional to the slip voltage of said induction motor irrespective of variations in its frequency.

In witness whereof, I have hereunto set my hand, this 18th day of March, 1926.

WALTER SEIZ.